United States Patent
Singh

(12) 
(10) Patent No.: US 6,374,319 B1
(45) Date of Patent: Apr. 16, 2002

(54) FLAG-CONTROLLED ARBITRATION OF REQUESTING AGENTS

(75) Inventor: Alok Singh, Fremont, CA (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 09/338,050

(22) Filed: Jun. 22, 1999

(51) Int. Cl.[7] .............................................. G06F 13/00
(52) U.S. Cl. ........................ 710/107; 710/113; 710/119; 710/240; 710/244
(58) Field of Search .......................... 710/107, 113–125, 710/240–244

(56) References Cited

U.S. PATENT DOCUMENTS

| | | | |
|---|---|---|---|
| 4,675,865 A | | 6/1987 | De Vries et al. ............... 370/85 |
| 4,872,004 A | | 10/1989 | Bahnick et al. ............. 340/825 |
| 5,047,921 A | * | 9/1991 | Kinter et al. ................ 711/147 |
| 5,051,946 A | * | 9/1991 | Cubranich et al. ........... 710/111 |
| 5,062,073 A | | 10/1991 | Masuda et al. ............. 364/900 |
| 5,293,493 A | | 3/1994 | Smith et al. ................. 395/325 |
| 5,416,910 A | * | 5/1995 | Moyer et al. ................ 710/113 |
| 5,473,762 A | * | 12/1995 | Krein et al. ................. 710/107 |
| 5,485,586 A | | 1/1996 | Brash et al. |
| 5,506,972 A | * | 4/1996 | Heath et al. ................. 710/113 |
| 5,532,633 A | * | 7/1996 | Kawai .......................... 327/174 |
| 5,550,875 A | * | 8/1996 | Bennett ....................... 375/356 |
| 5,671,369 A | | 9/1997 | La Berge et al. ........... 395/287 |

FOREIGN PATENT DOCUMENTS

| | | | |
|---|---|---|---|
| EP | 0332417 A1 | 9/1989 | ........... G06F/13/36 |
| EP | 0388574 A1 | 9/1990 | ........... H04L/12/40 |
| EP | 0488501 A2 | 6/1992 | ............. G06F/9/46 |
| EP | 0810529 A1 | 12/1997 | ......... G06F/13/364 |
| FR | 2675286 A1 | 10/1992 | ......... G06F/13/366 |
| GB | 2068690 A | 8/1981 | ........... H04L/11/16 |
| GB | 2168182 A | 6/1986 | ........... G06F/15/16 |
| GB | 2251361 A | 7/1992 | ........... H04L/12/40 |
| WO | WO8100468 | 2/1981 | ............. G06F/3/04 |
| WO | WO8603606 | 6/1986 | ............. G06F/9/46 |
| WO | WO9110959 | 7/1991 | ........... G06F/13/32 |
| WO | WO9218933 | 10/1992 | ......... G06F/13/366 |
| WO | WO9603696 | 2/1996 | ........... G06F/13/40 |
| WO | WO9724904 | 7/1997 | ........... H04Q/11/04 |
| WO | WO9812646 | 3/1998 | ......... G06F/13/362 |

* cited by examiner

Primary Examiner—Rupal Dharia

(57) ABSTRACT

A method and an system are provided for servicing a plurality of agents requesting access to a bus. The agents are arranged in a hierarchical order of groups, each having first and second pairs of the agents. Within each group, flags are set to indicate which pair was last serviced and which agent in each pair was last serviced.

8 Claims, 14 Drawing Sheets

FLAG-CONTROLLED ARBITRATION OF REQUESTING AGENTS

BACKGROUND OF THE INVENTION

1. Field of the Invention

The invention relates to arbitration in a digital system and, in particular, to control of access to a bus by a plurality of requesting agents.

2. Description of Related Art

Arbitration schemes for controlling fair access of a plurality of agents to a bus are known. For example, U.S. Pat. No. 5,485,586 proposes queuing requests for access to a bus and then granting access in the order dictated by the queued requests.

While maintaining fairness is an important function of arbitration, it is also desirable that arbitration be done as simply and expeditiously as is practical. It is also advantageous if the arbitration scheme employed is capable of ensuring that access be granted within minimum time periods, e.g. fairness intervals, that may be specified for certain high-speed applications. As used herein, a "fairness interval" is the time needed for all agents which are actually requesting access to the bus to be granted such access. For example, the IEEE 1394 High Performance Serial Bus Standard requires that, after receipt of a packet of information, if there is a need to retransmit the packet this must be done within four fairness intervals. In systems where access is granted in the order of queued requests, this requirement will not necessarily be met, but will depend on the order in which the requests are queued. In other words, the meeting of minimum-time-period requirements for access may be unpredictable. The IEEE 1394 Standard is particularly useful for high performance bus interconnection of computer peripherals and consumer electronics, and especially for the transmission of high-speed digital audio and video data over a bus.

SUMMARY OF THE INVENTION

It is an object of the invention to effect arbitration in a predictable and expeditious manner.

It is another object of the invention to provide the capability of ensuring bus access to each of a plurality of requesting agents within a specified minimum time period.

In accordance with the invention, a plurality of agents requesting access to a bus are serviced by:
  providing a communication path for accepting requests from first and second pairs of requesting agents;
  providing an indication of which of the requesting agents in the first pair was last considered for access to the bus;
  providing an indication of which of the requesting agents in the second pair was last considered for access to the bus;
  providing an indication of which of the pairs of requesting agents was last considered for access to the bus;
  granting access to the requesting agents currently requesting access in accordance with the priority:
    in the pair not last considered for access, the requesting agent not last considered for access;
    in the pair not last considered for access, the requesting agent last considered for access;
    in the pair last considered for access, the requesting agent not last considered for access;
    in the pair last considered for access, the requesting agent last considered for access.

This approach of granting access automatically adapts to the number of agents that are actually making requests. As will be explained in detail, it also provides the capability of expanding arbitration to any number of requesting agents.

DESCRIPTION OF THE PREFERRED EMBODIMENTS

Figure 1:
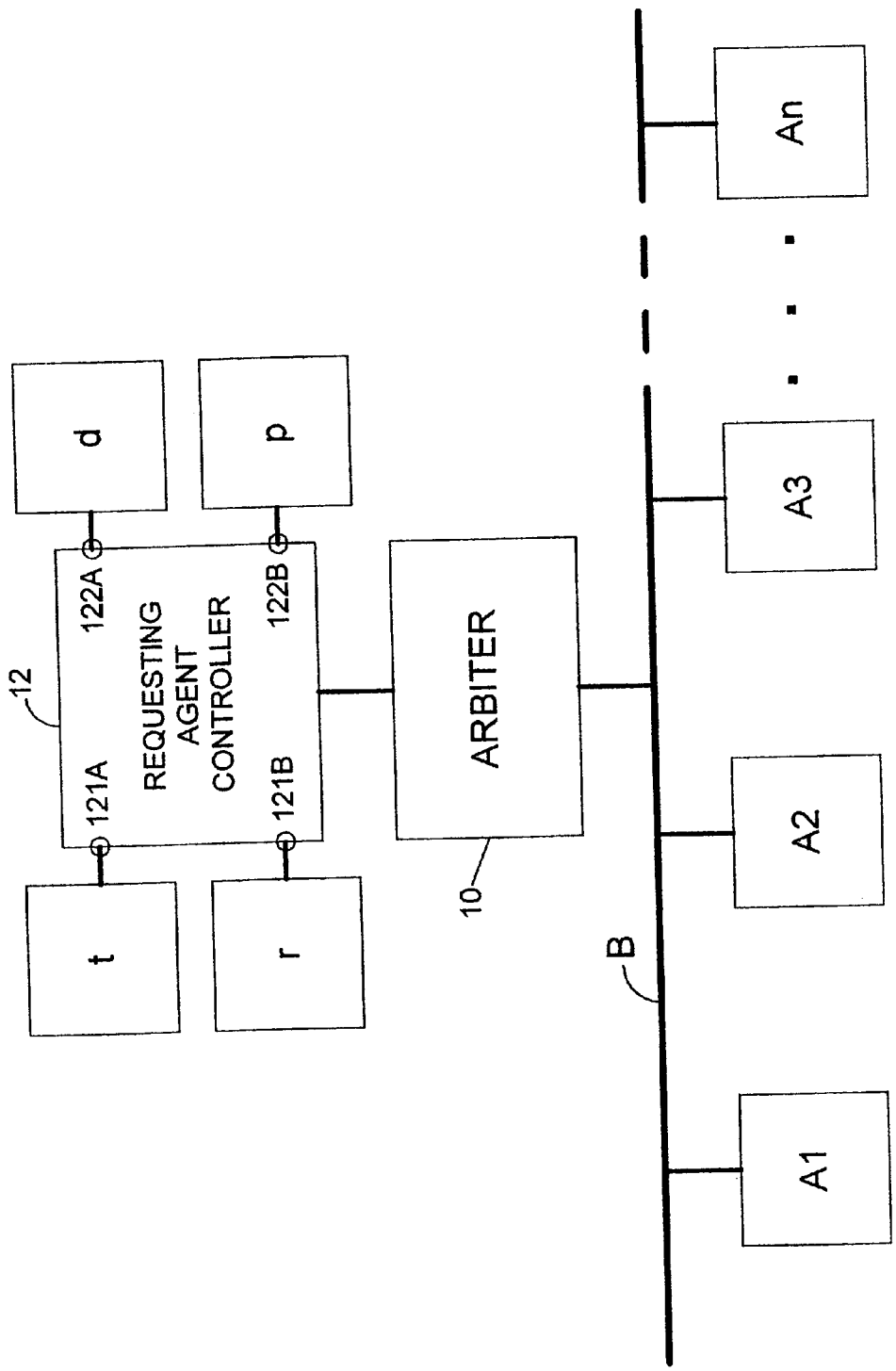
FIG. 1 is a block diagram of an exemplary digital system with which the invention may be utilized.

FIG. 1 generally illustrates an exemplary embodiment of one digital system with which the invention can be used. The system includes a first pair of requesting agents t and r, a second pair of requesting agents d and p, a bus B, and an arbiter 10 for controlling access of the requesting agents to the bus. A number of exemplary requested agents A1, A2, A3, ... An are coupled to the bus B. In this embodiment, the requesting agents t,r,d,p are coupled to the arbiter 10 indirectly via a requesting agent controller 12 to provide a path for making requests. Specifically, the first pair of requesting agents t and r are coupled to a first pair of controller ports 121A and 121B, respectively, the second pair of requesting agents d and p are coupled to a second pair of controller ports 122A and 122B, respectively, and the controller 12 is coupled to the arbiter 10. Alternative configurations are also possible, which permit the arbiter and the requesting agent controller to cooperatively control access of the requesting agents to the bus. For example, a second bus, isolated from the bus B, could be provided and the requesting agents, the requesting agent controller and the arbiter could all be coupled to the second bus for direct communication with each other. As another example, the arbiter 10 may be coupled to the requesting agents t,r,d,p through the controller 12, as shown in FIG. 1, and also through direct lines (not shown) to the requesting agents.

The requesting agents t,r,d,p comprise any agents which have the capability of controllably communicating information to requested agents coupled to a bus. Typical examples include devices such as FIFOs, DRAMs and video cameras. The requested agents A1,A2,A3, . . . An, comprise any agents which are capable of being communicated with via an arbiter, e.g. FIFOs and DRAMS.

The requesting agent controller 12 manages the flow of information from the requesting agents t,r,d,p to the arbiter 10. For example, if one of the requesting agents is a FIFO, the controller would continually effect updating of pointers designating locations in the FIFO where information should be written into or retrieved from. The controller 12 also monitors the state of completion of each transmission from the requesting agents to the bus. The controller may also perform functions to facilitate unique requirements of the digital system. For example, if the bus B is operating in accordance with the IEEE 1394 Standard, whenever the bus is unavailable, the controller may temporarily store information that is to be transmitted over the bus.

The arbiter 10 detects requests for access to the bus B by the requesting agents t,r,d,p, sets flags indicating which pair of the requesting agents, and which agent in each pair, were last considered for access to the bus and, on the basis of these flags, decides which of the requesting agents will be given access to the bus next. Granting of access is made in accordance with the priority:

in the pair not last considered for access, the requesting agent not last considered for access;

in the pair not last considered for access, the requesting agent last considered for access;

in the pair last considered for access, the requesting agent not last considered for access;

in the pair last considered for access, the requesting agent last considered for access.

Figure 2:
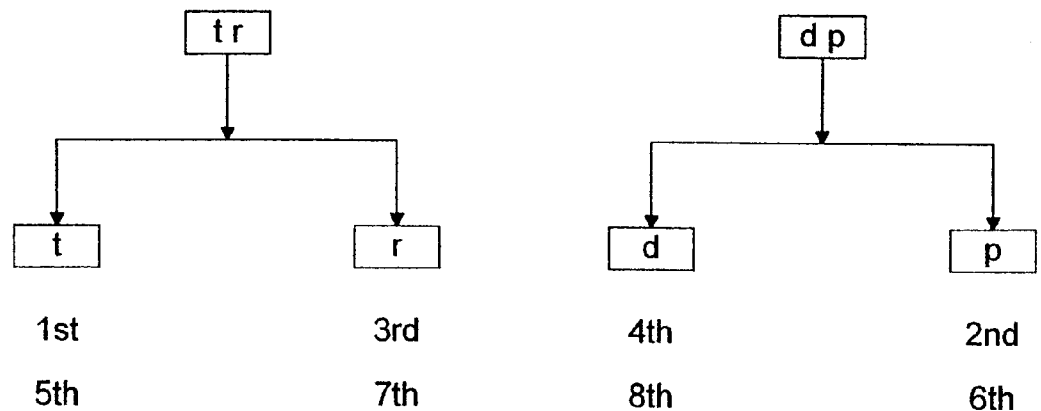
FIGS. 2 through 5 are schematic diagrams illustrating arbitration in exemplary request situations.

FIGS. 2, 3, 4 and 5 illustrate the order in which access to the bus is granted in four different situations, i.e.:

All four of the agents t,r,d,p are requesting access (FIG. 2).

Figure 3:
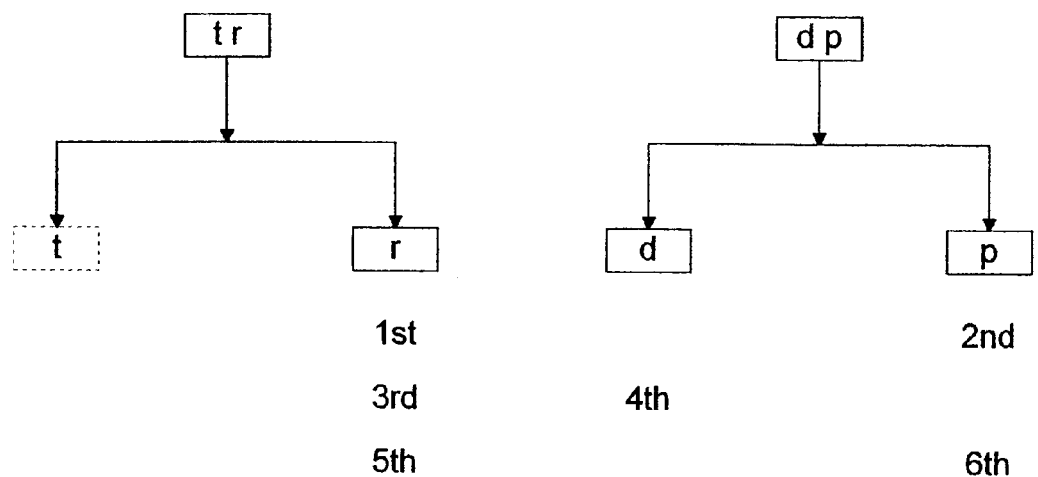

Only agents r,d, and p (both from one pair and only one of the other pair) are requesting access (FIG. 3).

Figure 4:
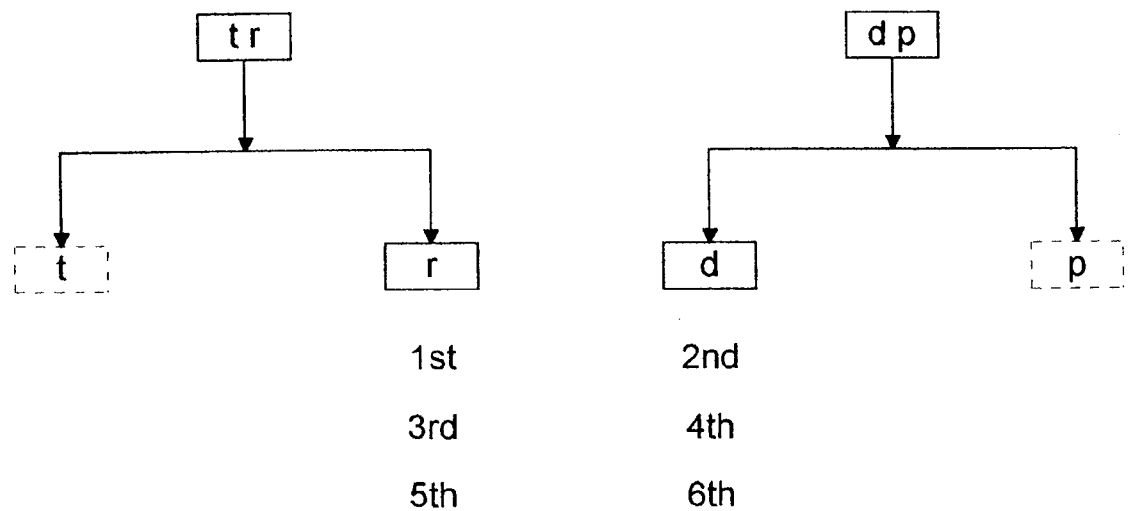

Only agents r and d (one from each pair) are requesting access (FIG. 4).

Figure 5:
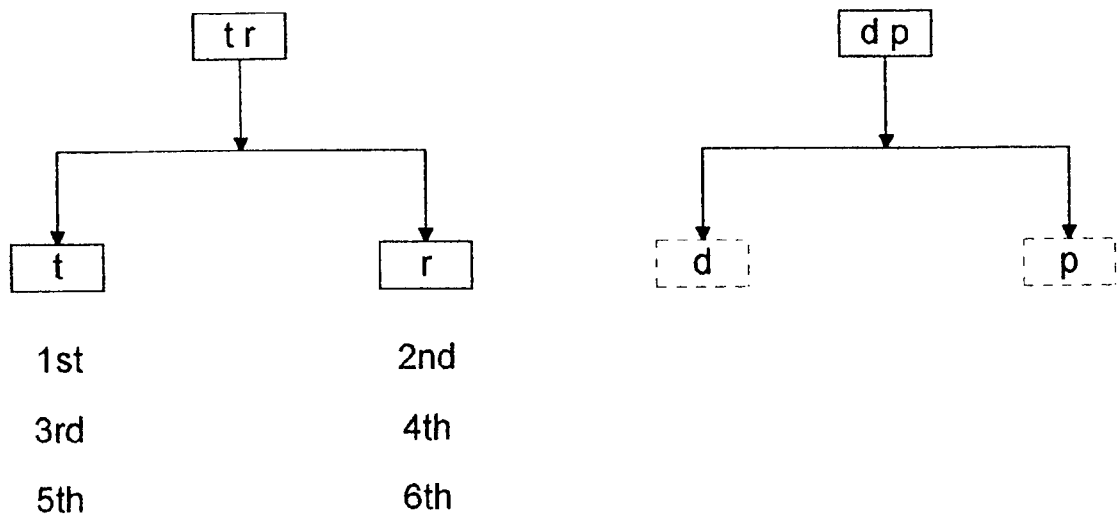

Only agents t and r (both from one pair, none from the other) are requesting access (FIG. 5).

All other possible situations are similar to those shown in FIGS. 3, 4 and 5. That is:

FIG. 3 can be adapted to represent the situations where agent r, d or p is the only agent not requesting access to the bus.

FIG. 4 can be adapted to represent the situation where only agents t and p are requesting access.

FIG. 5 can be adapted to represent the situation where only agents d and p are requesting access.

Note that the dashed boxes in FIGS. 3, 4 and 5 indicate either the situation where the agent it represents is not currently requesting access or no such agent is currently connected to the system. In either case, such agent will be treated as an existing agent which is not requesting.

Figure 6A:
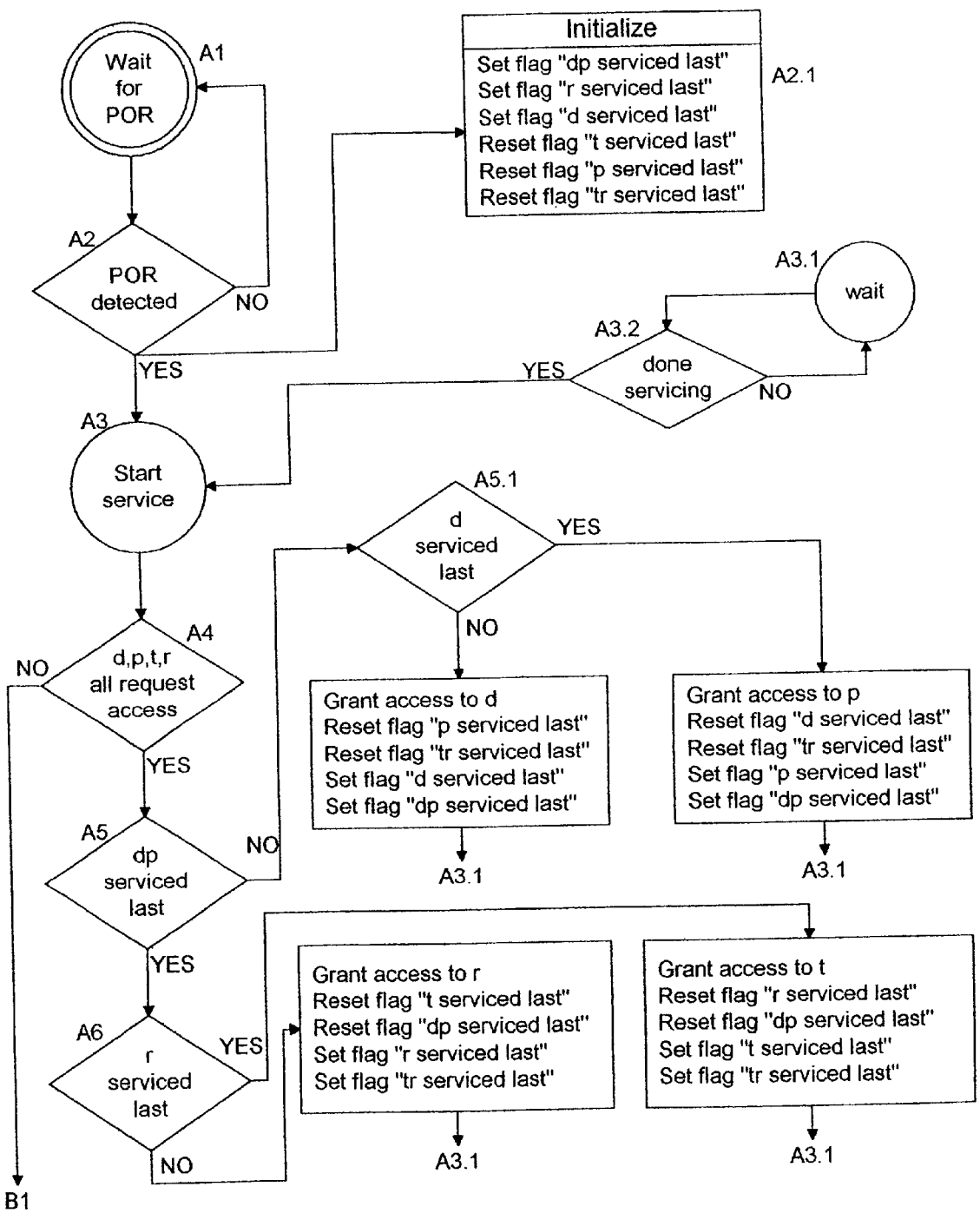
FIG. 6 is a flow chart illustrating an exemplary arbitration method in accordance with the invention.

An embodiment of a method for granting access to requesting agents in accordance with the invention is depicted in the flow diagram provided in FIGS. 6A through 6J. As is shown in FIG. 6A, the arbiter 10 begins the method by waiting for a power on reset (POR) command at A1. When this command is detected at A2, the arbiter initializes the system at A2.1 by setting and resetting predetermined flags indicating the last-serviced status of the agents. This establishes the initial priorities of access to the bus by the agents. Specifically, the arbiter sets one flag which is provided to indicate which pair of agents (tr or dp) was serviced last (i.e., last considered for access to the bus B), sets one flag in each pair which is provided to indicate which agent in the pair was serviced last, and resets corresponding flags for the other pair of agents and the other agents in the pairs. In the example depicted, the arbiter:

sets flag dp, indicating that dp is the last pair of agents that was serviced;

resets flag tr, indicating that tr is not the last pair that was serviced;

sets flags r and d, indicating that these are the last agents that were serviced in the pairs tr and dp, respectively;

resets flags t and p, indicating that these are not the last agents that were serviced in the pairs tr and dp, respectively.

Figure 6B:
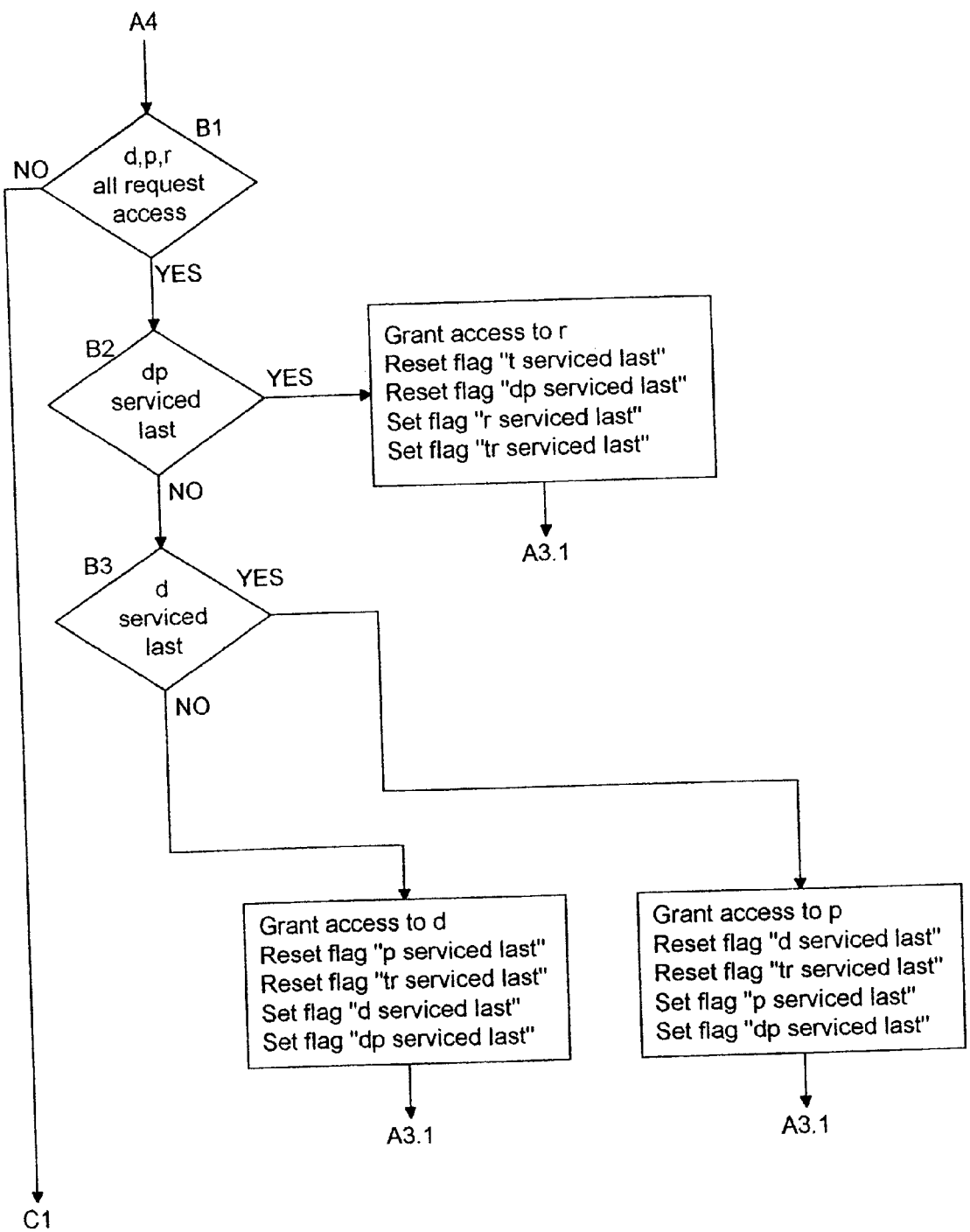

After initializing the system, the arbiter goes into a start service state at A3 and then detects at decision A4 whether all of the agents d,p,t,r are requesting access to the bus B. If NO, it goes to decision B1 (FIG. 6B). If YES, however, the arbiter goes to decision A5 and detects whether dp is the last pair that was serviced. If decision A5 is YES, the arbiter goes to decision A6 and detects whether agent r is the last of pair tr that was serviced.

If decision A6 is YES, the arbiter:

grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed (i.e. agent t has completed its transmission to the bus B); and when the service to agent t has been completed, returns to the start service state at A3.

If decision A6 is NO, the arbiter:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent r has been completed (i.e. agent r has completed its transmission to the bus B); and when the service to agent r has been completed, returns to the start service state at A3.

If decision A5 was NO, the arbiter goes to decision A5.1 and detects whether agent d is the last of the pair dp that was serviced. If decision A5.1 is YES, the arbiter:

grants access to agent p;

resets flags d and tr, indicating that agent d and pair tr were not serviced last;

sets flags p and dp, indicating that agent p and pair dp were serviced last;

goes into a wait mode at A3.1 until it detects, at decision A3.2, when the service to agent p has been completed (i.e. agent p has completed its transmission to the bus B); and when the service to agent p has been completed, returns to the start service state at A3.

If decision A4 is NO, the arbiter:

grants access to agent d;

resets flags p and tr, indicating that agent p and pair tr were not serviced last;

sets flags d and dp, indicating that agent d and pair dp were serviced last;

goes into a wait mode at A3.1 until it detects, at decision A3.2, when the service to agent d has been completed (i.e. agent d has completed its transmission to the bus B); and when the service to agent d has been completed, returns to the start service state at A3.

Whenever decision A4 is NO, the arbiter goes down the priority of decision chain:

B1: Are agents d,p,r all requesting access? (See FIG. 6B.)

C1: Are agents d,p,t all requesting access? (See FIG. 6C.)

D1: Are agents p,t,r all requesting access? (See FIG. 6D.)

E1: Are agents d,t,r all requesting access? (See FIG. 6E.)

F1: Are agents d,p both requesting access? (See FIG. 6F.)

G1: Are agents t,r both requesting access? (See FIG. 6G.)

H1: Are agents p,r both requesting access? (See FIG. 6H.)

I1: Are agents p,t both requesting access? (See FIG. 6I.)

J1: Is pair tr or pair dp requesting access? (See FIG. 6J.) until it detects a request. If no requests are detected, the arbiter returns to the start service state A3.

Figure 6C:
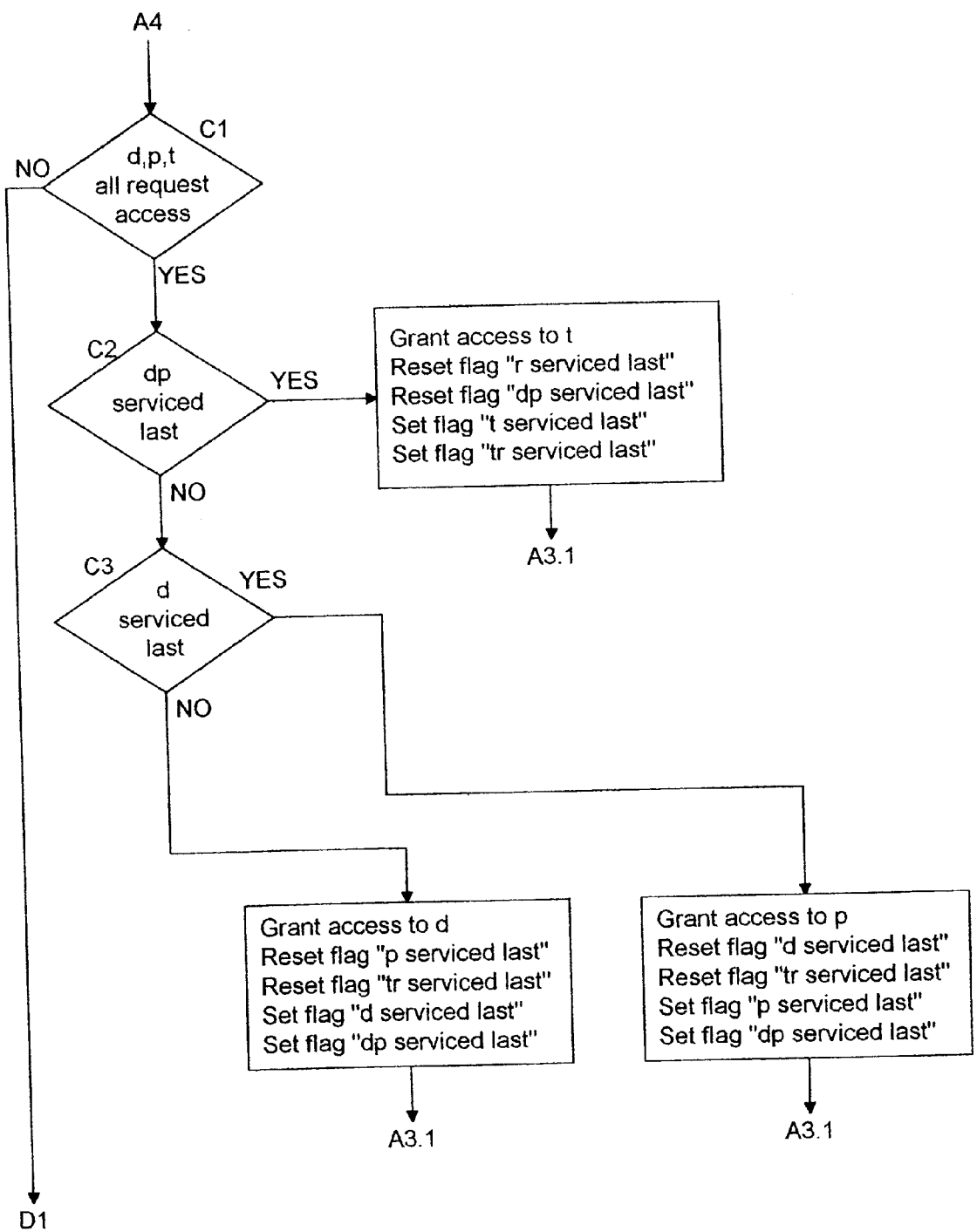

FIG. 6B illustrates a subroutine beginning at the decision B1, where the arbiter detects whether all of the agents d,p,r are requesting access to the bus B. If NO, it goes to decision C1 (FIG. 6C). If YES, however, the arbiter goes to decision B2 and detects whether dp is the last pair that was serviced.

If decision B2 is YES, the arbiter:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent t has been completed; and when the service to agent t has been completed, returns to the start service state at A3.

If decision B2 is NO, the arbiter goes to decision B3 and detects whether agent d is the last of pair dp that was serviced.

If decision B3 is YES, the arbiter:

grants access to agent p;

resets flags d and tr, indicating that agent d and pair tr were not serviced last;

sets flags p and dp, indicating that agent p and pair dp were serviced last;

goes into a wait mode at A3.1 until it detects, at decision A3.2, when the service to agent p has been completed; and when the service to agent p has been completed, returns to the start service state at A3.

If decision B3 is NO, the arbiter:

grants access to agent d;

resets flags p and tr, indicating that agent p and pair tr were not serviced last;

sets flags d and dp, indicating that agent d and pair dp were serviced last;

goes into a wait mode at A3.1 until it detects, at decision A3.2, when the service to agent d has been completed; and when the service to agent d has been completed, returns to the start service state at A3.

Figure 6D:
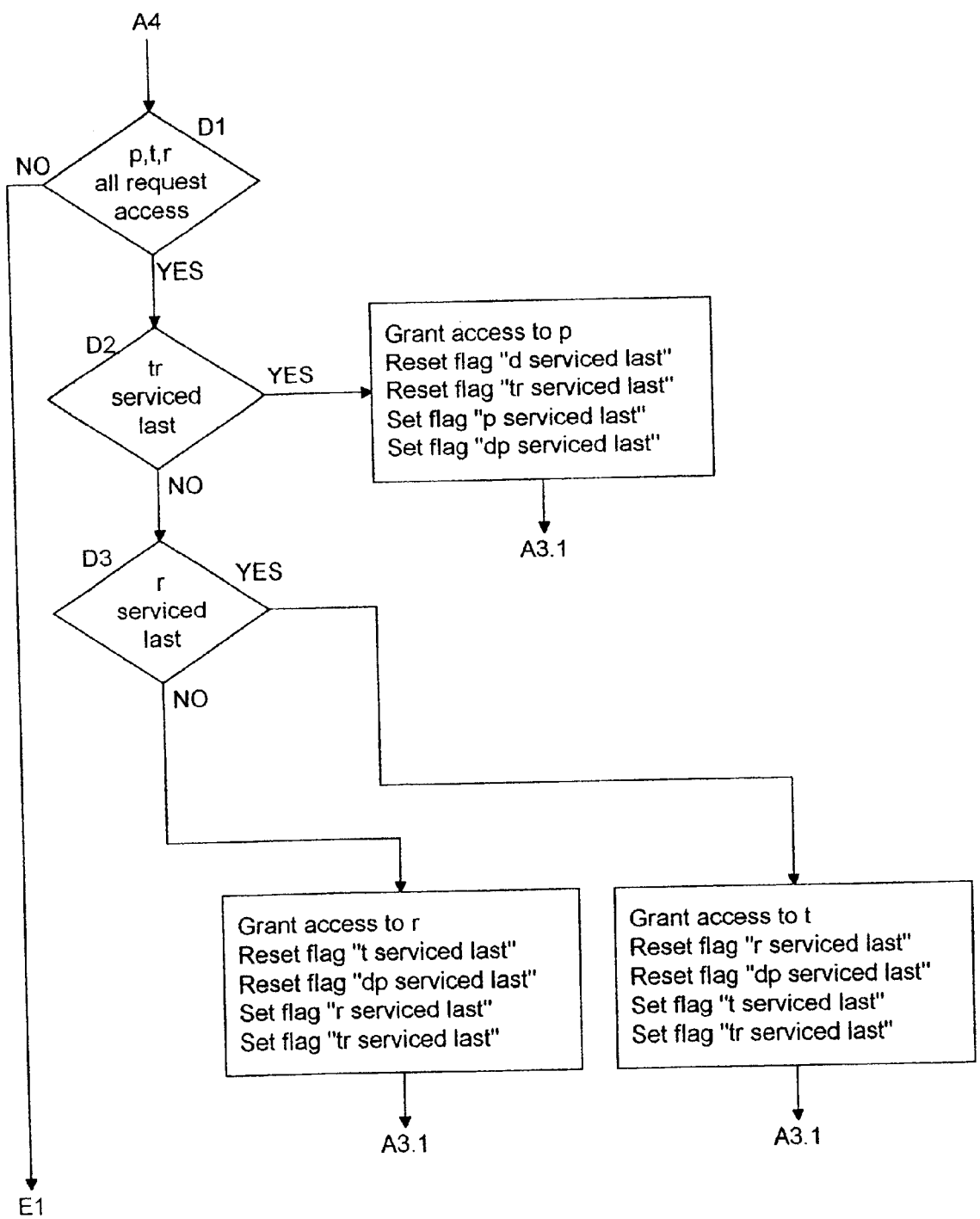

FIG. 6C illustrates a subroutine beginning at the decision C1, where the arbiter detects whether all of the agents d,p,t are requesting access to the bus B. If NO, it goes to decision D1 (FIG. 6D). If YES, however, the arbiter goes to decision C2 and detects whether dp is the last pair that was serviced.

If decision C2 is YES, the arbiter:

grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed; and when the service to agent t has been completed, returns to the start service state at A3.

If decision C2 is NO, the arbiter goes to decision C3 and detects whether agent d is the last of pair dp that was serviced.

If decision C3 is YES, the arbiter:

grants access to agent p;

resets flags d and tr, indicating that agent d and pair tr were not serviced last;

sets flags p and dp, indicating that agent p and pair dp were serviced last;

goes into a wait mode at A3.1 until it detects, at decision A3.2, when the service to agent p has been completed; and when the service to agent p has been completed, returns to the start service state at A3.

If decision C3 is NO, the arbiter:

grants access to agent d;

resets flags p and tr, indicating that agent p and pair tr were not serviced last;

sets flags d and dp, indicating that agent d and pair dp were serviced last;

goes into a wait mode at A3.1 until it detects, at decision A3.2, when the service to agent d has been completed; and when the service to agent d has been completed, returns to the start service state at A3.

Figure 6E:
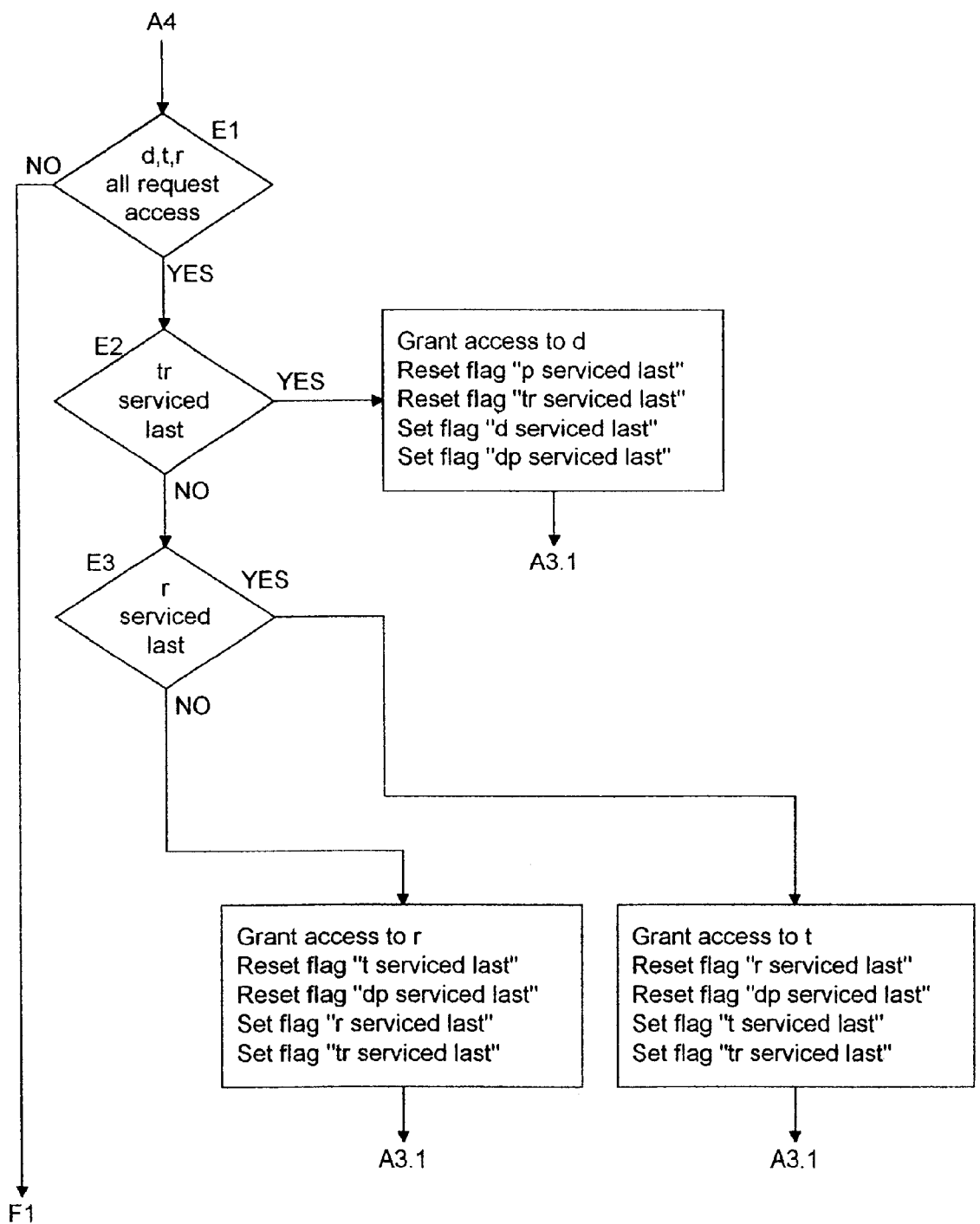

FIG. 6D illustrates a subroutine beginning at the decision D1, where the arbiter detects whether all of the agents p,t,r are requesting access to the bus B. If NO, it goes to decision E1 (FIG. 6E). If YES, however, the arbiter goes to decision D2 and detects whether tr is the last pair that was serviced.

If decision D2 is YES, the arbiter:

a grants access to agent p;

resets flags d and tr, indicating that agent d and pair tr were not serviced last;

sets flags p and dp, indicating that agent p and pair dp were serviced last;

goes into a wait mode at A3.1 until it detects, at decision A3.2, when the service to agent p has been completed; and when the service to agent p has been completed, returns to the start service state at A3.

If decision D2 is NO, the arbiter goes to decision D3 and detects whether agent r is the last of pair tr that was serviced.

If decision D3 is YES, the arbiter:

grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed; and a when the service to agent t has been completed, returns to the start service state at A3.

If decision D3 is NO, the arbiter:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent r has been completed; and when the service to agent r has been completed, returns to the start service state at A3.

Figure 6F:
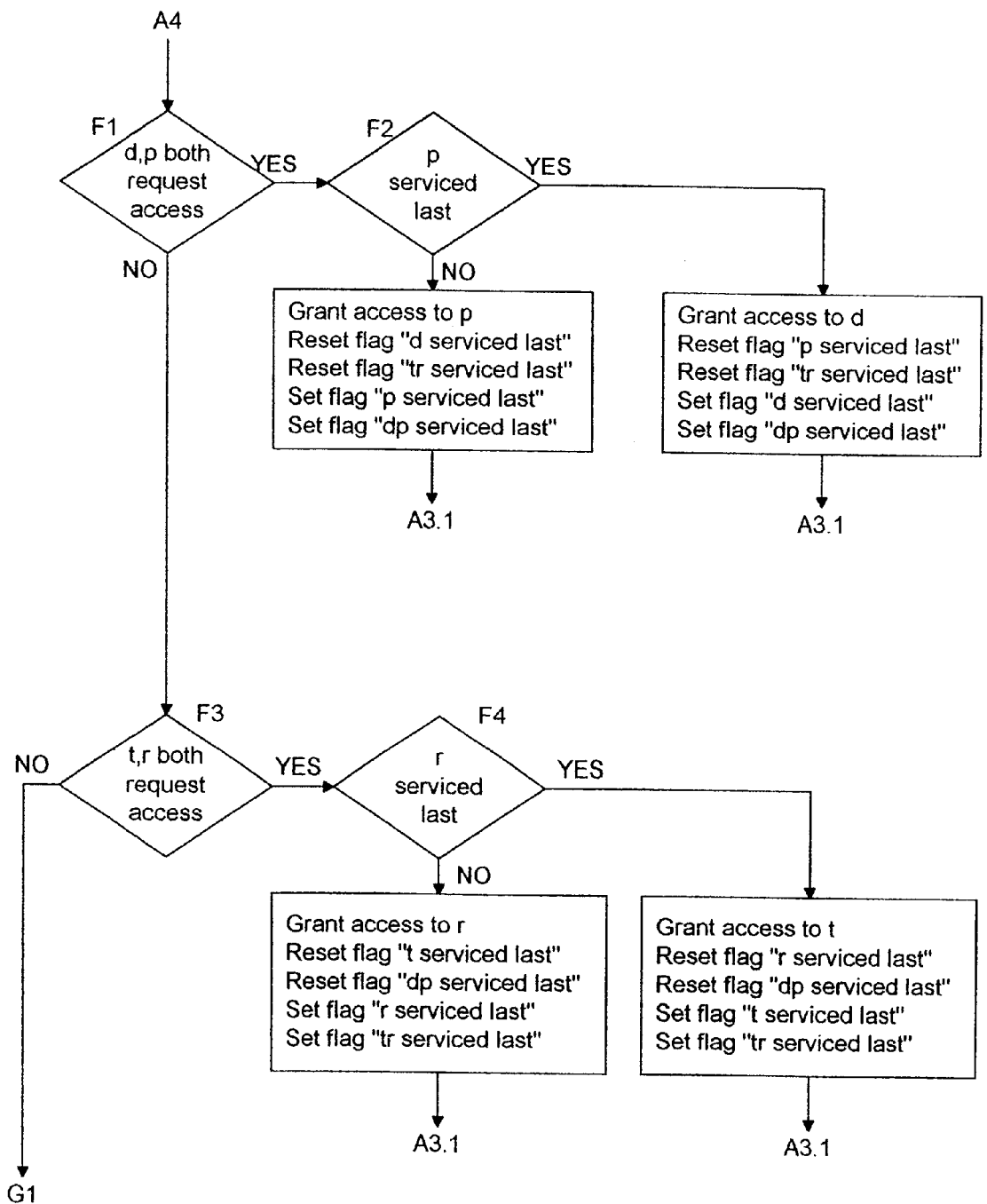

FIG. 6E illustrates a subroutine beginning at the decision E1, where the arbiter detects whether all of the agents d,t,r are requesting access to the bus B. If NO, it goes to decision F1 (FIG. 6F). If YES, however, the arbiter goes to decision E2 and detects whether tr is the last pair that was serviced.

If decision E2 is YES, the arbiter:

grants access to agent d;

resets flags p and tr, indicating that agent p and pair tr were not serviced last;

sets flags d and dp, indicating that agent d and pair dp were serviced last;

goes into a wait mode at A3.1 until it detects, at decision A3.2, when the service to agent d has been completed; and when the service to agent d has been completed, returns to the start service state at A3.

If decision E2 is NO, the arbiter goes to decision E3 and detects whether agent r is the last of pair tr that was serviced.

If decision E3 is YES, the arbiter:

grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed; and when the service to agent t has been completed, returns to the start service state at A3.

If decision E3 is NO, the arbiter:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent r has been completed; and when the service to agent r has been completed, returns to the start service state at A3.

Figure 6G:
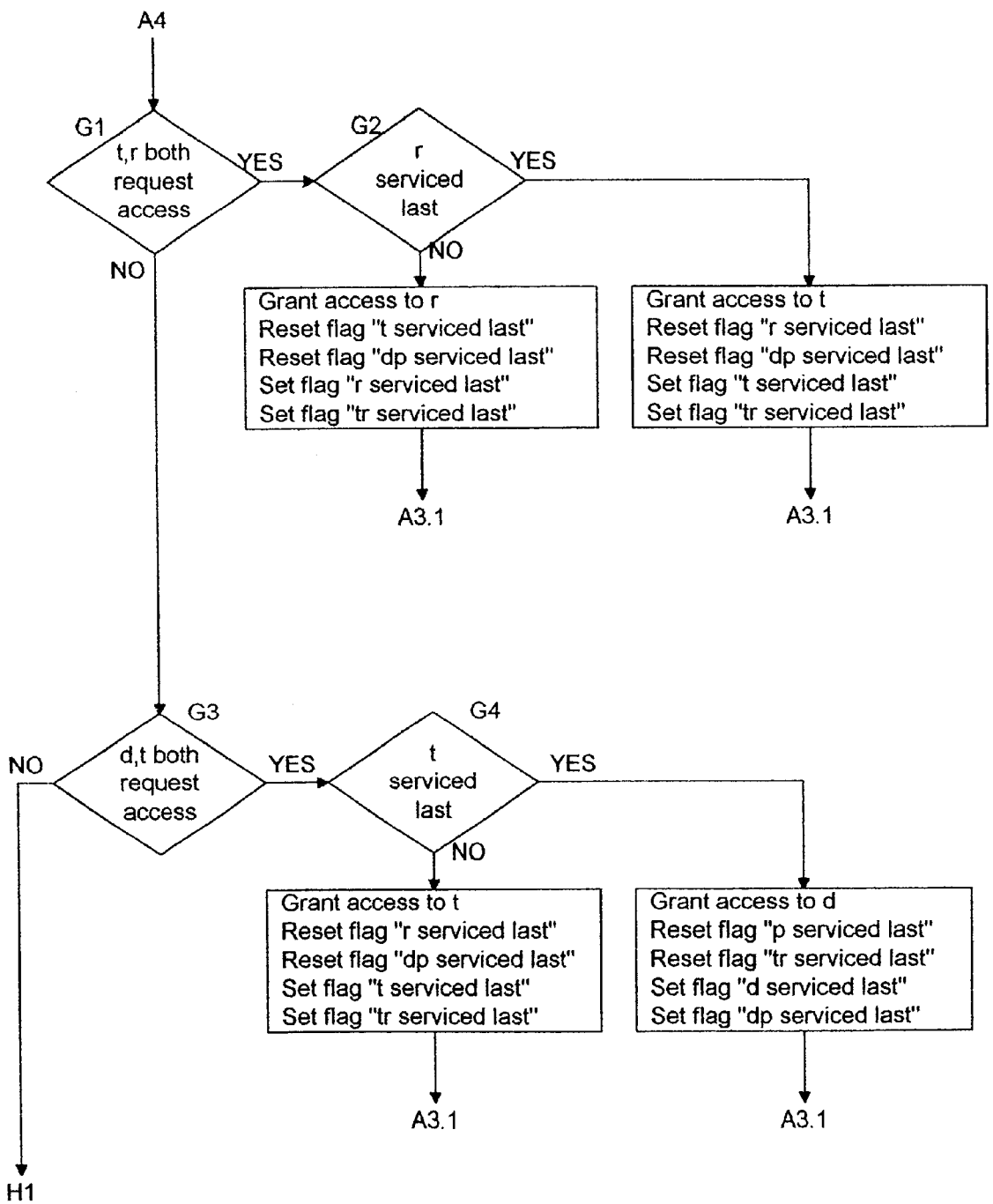

FIG. 6F illustrates a subroutine beginning at the decision F1, where the arbiter detects whether both of the agents d,p are requesting access to the bus B. If NO, it goes to decision F3 and detects whether both of agents t,r are requesting access to the bus B. If NO, it goes to decision G1 (FIG. 6G).

If decision F1 is YES, the arbiter goes to decision F2 and detects whether agent p is the last of pair dp that was serviced.

If decision F2 is YES, it:

grants access to agent d;

resets flags p and tr, indicating that agent p and pair tr were not serviced last;

sets flags d and dp, indicating that agent d and pair dp were serviced last;

goes into a wait mode at A3.1 until it detects, at decision A3.2, when the service to agent d has been completed; and when the service to agent d has been completed, returns to the start service state at A3.

If decision F2 is NO, it:

grants access to agent p;

resets flags d and tr, indicating that agent d and pair tr were not serviced last;

sets flags p and dp, indicating that agent p and pair dp were serviced last;

goes into a wait mode at A3.1 until it detects, at decision A3.2, when the service to agent p has been completed; and when the service to agent p has been completed, returns to the start service state at A3.

If decision F3 is YES, the arbiter goes to decision F4 and detects whether agent r is the last of pair tr that was serviced.

If decision F4 is YES, it:

grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed; and when the service to agent t has been completed, returns to the start service state at A3.

If decision F4 is NO, the arbiter:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent r has been completed; and when the service to agent r has been completed, returns to the start service state at A3.

Figure 6H:
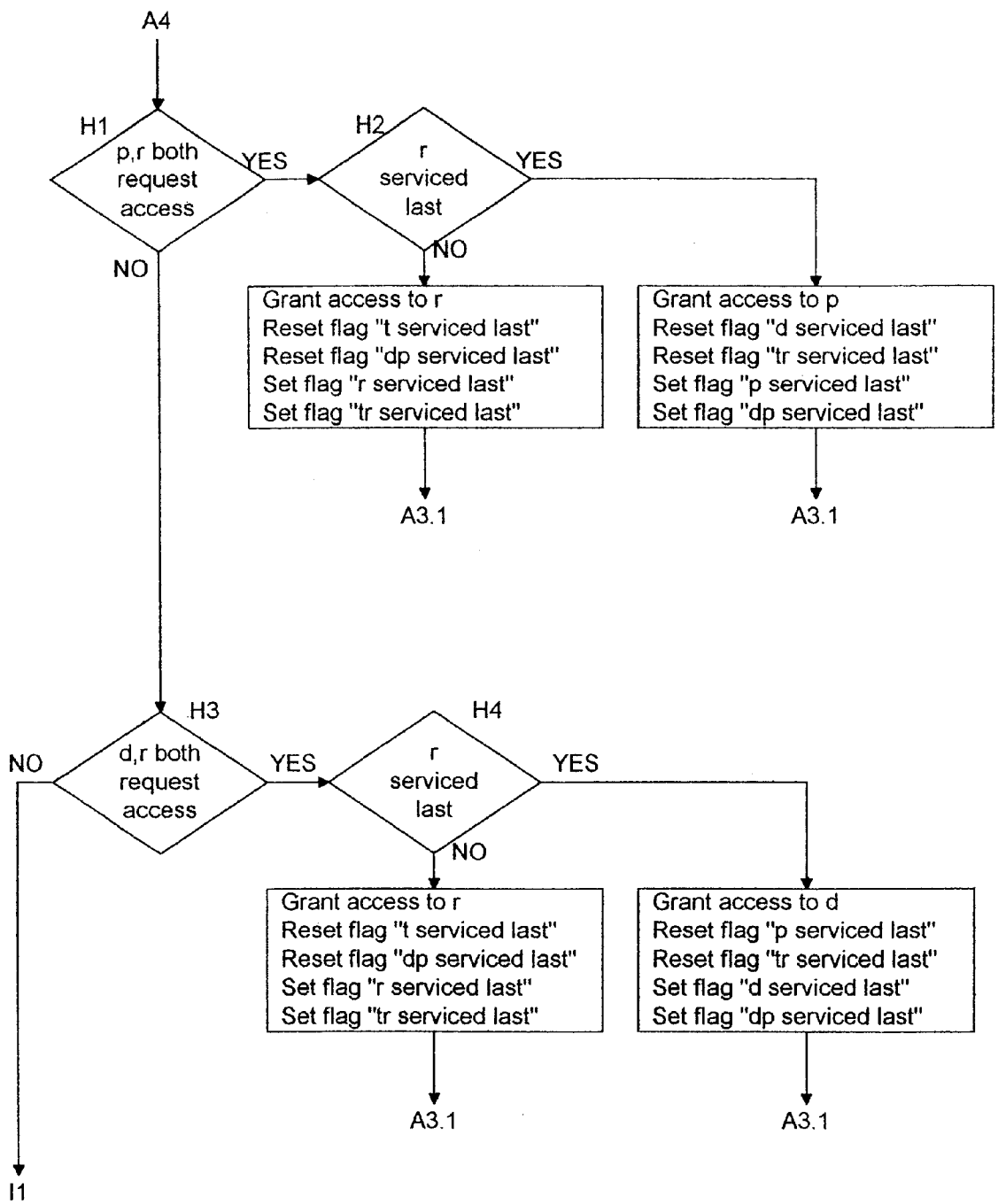

FIG. 6G illustrates a subroutine beginning at the decision G1, where the arbiter detects whether both of the agents t,r are requesting access to the bus B. If NO, it goes to decision G3 and detects whether both of agents d,t are requesting access to the bus B. If NO, it goes to decision H1 (FIG. 6H).

If decision G1 is YES, the arbiter goes to decision G2 and detects whether agent r is the last of pair tr that was serviced.

If decision G2 is YES, it:

grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed; and when the service to agent t has been completed, returns to the start service state at A3.

If decision G2 is NO, it:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent r has been completed; and when the service to agent r has been completed, returns to the start service state at A3.

If decision G3 is YES, the arbiter goes to decision G4 and detects whether agent t is the last of pair dt that was serviced.

If decision G4 is NO, it:

grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed; and when the service to agent t has been completed, returns to the start service state at A3.

If decision G4 is YES, the arbiter:

grants access to agent d;

resets flags p and tr, indicating that agent p and pair tr were not serviced last;

sets flags d and dp, indicating that agent d and pair dp were serviced last;

goes into a wait mode at A3.1 until it detects, at decision A3.2, when the service to agent d has been completed; and when the service to agent d has been completed, returns to the start service state at A3.

Figure 6I:
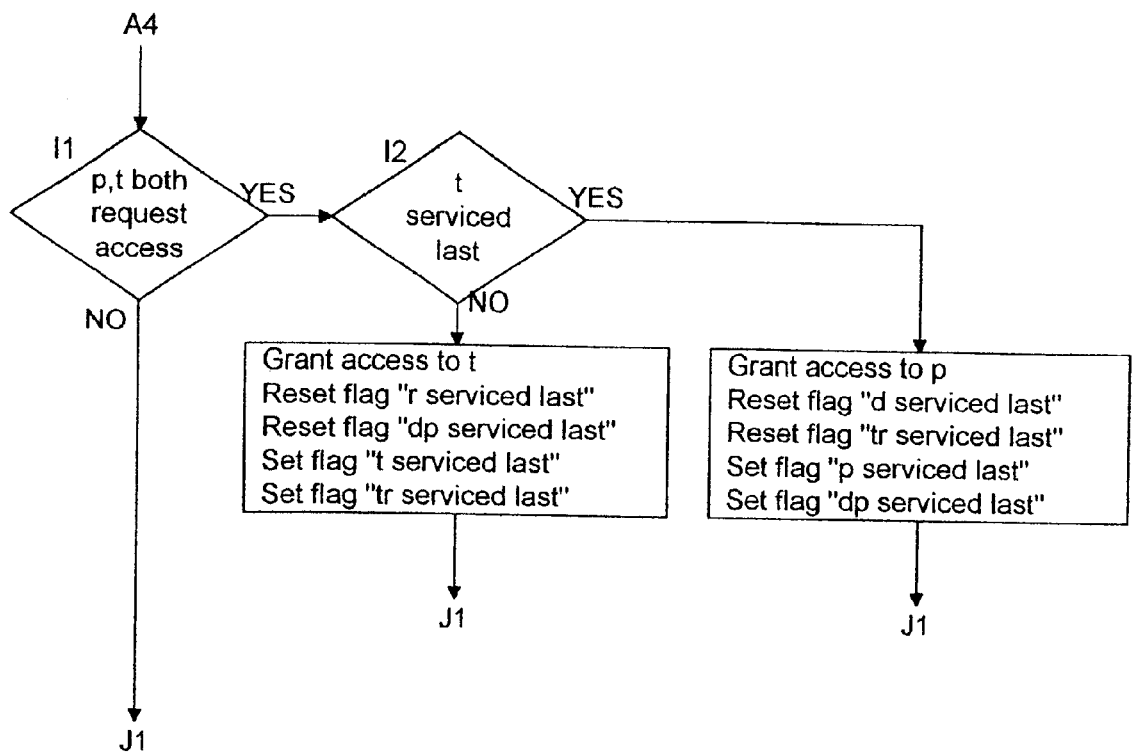

FIG. 6H illustrates a subroutine beginning at the decision H1, where the arbiter detects whether both of the agents p,r are requesting access to the bus B. If NO, it goes to decision H3 and detects whether both of agents d,r are requesting access to the bus B. If NO, it goes to decision I1 (FIG. 6I).

If decision H1 is YES, the arbiter goes to decision H2 and detects whether agent r is the last of pair pr that was serviced.

If decision H2 is NO, it:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent r has been completed; and when the service to agent r has been completed, returns to the start service state at A3.

If decision H2 is YES, it:

grants access to agent p;

resets flags d and tr, indicating that agent d and pair tr were not serviced last;

sets flags p and dp, indicating that agent p and pair dp were serviced last;

goes into a wait mode at A3.1 until it detects, at decision A3.2, when the service to agent p has been completed; and when the service to agent p has been completed, returns to the start service state at A3.

If decision H3 is YES, the arbiter goes to decision H4 and detects whether agent r is the last of pair dr that was serviced.

If decision H4 is YES, it:

grants access to agent d;

resets flags p and tr, indicating that agent p and pair tr were not serviced last;

sets flags d and dp, indicating that agent d and pair dp were serviced last;

goes into a wait mode at A3.1 until it detects, at decision A3.2, when the service to agent d has been completed; and when the service to agent d has been completed, returns to the start service state at A3.

If decision H4 is NO, the arbiter:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent r has been completed; and when the service to agent r has been completed, returns to the start service state at A3.

Figure 6J:
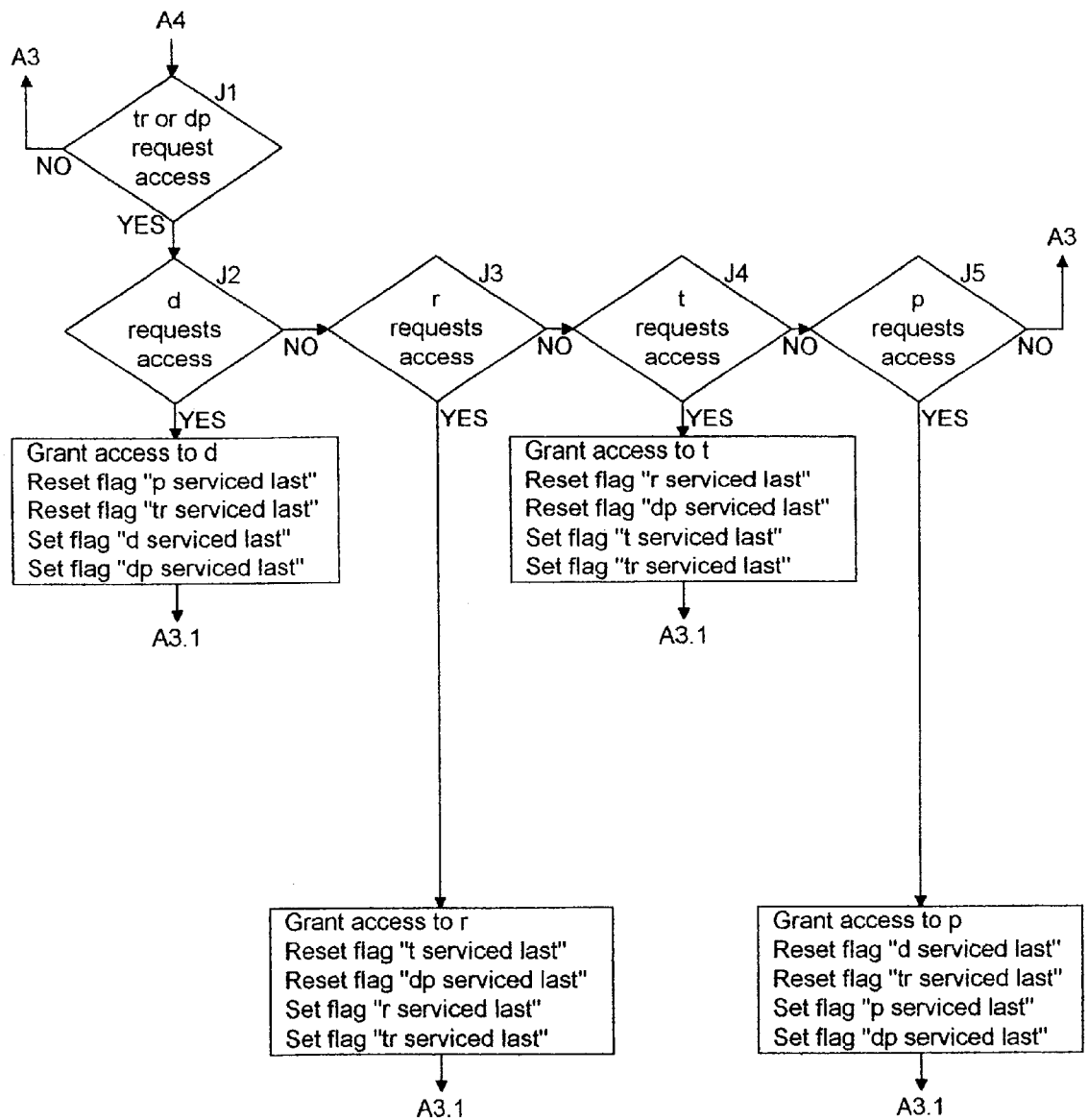
Figure 7A:
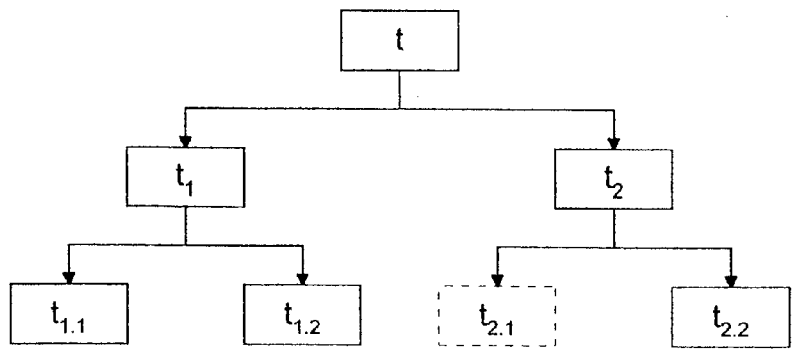
FIG. 7 is a schematic diagram showing applicability of the invention to a variable number of requester agents.
Figure 7B:
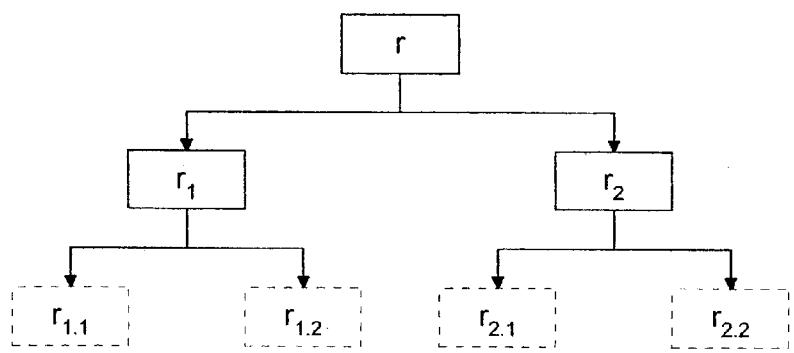
Figure 7C:
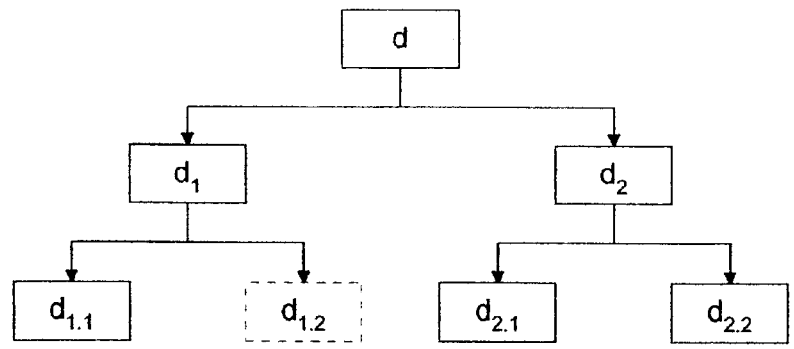
Figure 7D:
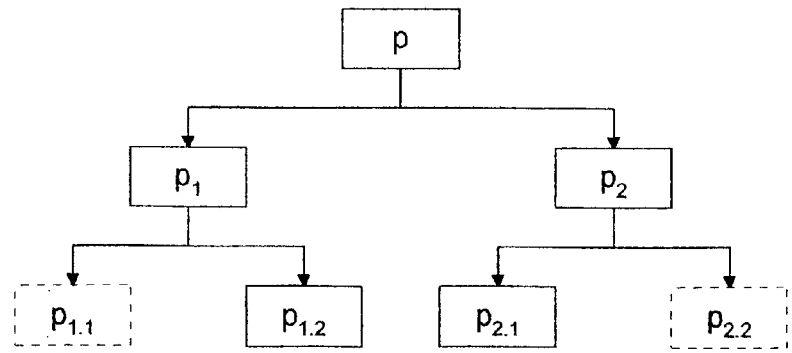

FIG. 6I illustrates a subroutine beginning at the decision I1, where the arbiter detects whether both of the agents p,t are requesting access to the bus B. If NO, it goes to decision J1 (FIG. 6J). If YES, however, the arbiter goes to decision I2 and detects whether agent t is the last of agents p,t that was serviced. If decision I2 is NO, it:

grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed; and when the service to agent t has been completed, returns to the start service state at A3.

If decision I2 is YES, it:

grants access to agent p;

resets flags d and tr, indicating that agent d and pair tr were not serviced last;

sets flags p and dp, indicating that agent p and pair dp were serviced last;

goes into a wait mode at A3.1 until it detects, at decision A3.2, when the service to agent p has been completed; and when the service to agent p has been completed, returns to the start service state at A3.

FIG. 6J illustrates a subroutine beginning at the decision J1, where the arbiter detects whether pair tr or pair dp is requesting access to the bus B. If NO, the arbiter returns to the start service state at A3.

If decision J1 is YES, the arbiter goes to decision J2 and detects whether agent d is requesting access. If YES, it:

grants access to agent d;

resets flags p and tr, indicating that agent p and pair tr were not serviced last;

sets flags d and dp, indicating that agent d and pair dp were serviced last;

goes into a wait mode at A3.1 until it detects, at decision A3.2, when the service to agent d has been completed; and when the service to agent d has been completed, returns to the start service state at A3.

If decision J2 is NO, the arbiter goes to decision J3 and detects whether agent r is requesting access. If YES, it:

grants access to agent r;

resets flags t and dp, indicating that agent t and pair dp were not serviced last;

sets flags r and tr, indicating that agent r and pair tr were serviced last;

goes into a wait mode at A3.1 until it detects, at decision A3.2, when the service to agent r has been completed; and when the service to agent r has been completed, returns to the start service state at A3.

If decision J3 is NO, the arbiter goes to decision J4 and detects whether agent t is requesting access. If YES, it:

a grants access to agent t;

resets flags r and dp, indicating that agent r and pair dp were not serviced last;

sets flags t and tr, indicating that agent t and pair tr were serviced last;

goes into a wait mode at A3.1 until it detects, at decision A3.2, when the service to agent t has been completed; and when the service to agent t has been completed, returns to the start service state at A3.

If decision J4 is NO, the arbiter goes to decision J5 and detects whether agent p is requesting access. If YES, it:

grants access to agent p;

resets flags d and tr, indicating that agent d and pair tr were not serviced last;

sets flags p and dp, indicating that agent p and pair dp were serviced last;

goes into a wait mode at A3.1 until it detects, at decision A3.2, when the service to agent p has been completed; and when the service to agent p has been completed, returns to the start service state at A3.

If decision J5 is NO, the arbiter returns to the start service state at A3.

FIG. 7 illustrates how a system employing arbitration methods in accordance with the invention can be expanded to any number of requesting agents. In particular, FIGS. 7A, 7B, 7C, and 7D collectively show an example of the priority of servicing up to 28 requesting agents, coupled to the controller 12 shown in FIG. 1. As in FIGS. 3 through 5, each of the dashed boxes represents either an agent which is not currently requesting access or an agent which is not actually connected to the system.

Each of the agents is assigned a hierarchical designation which defines its priority of servicing. In this particular example, there are three hierarchical levels:

a primary level, having the requesting agents t,r,d,p;

a secondary level, having the requesting agents $t_1$, $t_2$, $r_1$, $r_2$, $d_1$, $d_2$, $p_1$, $p_2$; and a tertiary level, having the requesting agents $t_{1.1}$, $t_{1.2}$, $t_{2.1}$, $t_{2.2}$, $r_{1.1}$, $r_{1.2}$, $r_{2.1}$, $r_{2.2}$, $d_{1.1}$, $d_{1.2}$, $d_{2.1}$, $d_{2.2}$, $p_{1.1}$, $p_{1.2}$, $p_{2.1}$, $p_{2.2}$.

Utilizing the flow chart of FIG. 6, groups of these agents will be sequentially serviced in the order:

group t,r,d,p;

group $t_1,r_1,d_1,p_1$;

group $t_2,r_2,d_2,P_2$;

group $t_{1.1},r_{1.1},d_{1.1},p_{1.1}$;

group $t_{1.2},r_{1.2},d_{1.2},p_{1.2}$;

group $t_{2.1},r_{2.1},d_{2.1},p_{2.1}$;

group $t_{2.2},r_{2.2},d_{2.2},p_{2.2}$.

In order to implement servicing in this order, a set of flags (e.g. one for each group) may be utilized to keep track of which group was serviced last. Note that the priorities of service of individual agents can be changed simply by changing their heirarchical designations.

The sequence in which the agents in each of the groups of FIG. 7 are granted access, in accordance with the preferred embodiment, can be determined by referring to a whichever one of FIGS. 2 through 5 corresponds to the comparable request situation. Specifically:

In the single group t,r,d,p of the primary level, all four of these agents are requesting. This corresponds-to the situation shown in FIG. 2, and these requesting agents will be granted access in the order determined by FIG. 6A of the flow chart. Then the first group of the secondary level will be serviced.

In the first group $t_1,r_1,d_1,p_1$ of the secondary level, all four of these agents are requesting. This also corresponds to the situation shown in FIG. 2, and these requesting agents will be granted access in the order determined by FIG. 6A of the flow chart. Then the second group of the secondary level will be serviced.

In the second group $t_2,r_2,d_2,p_2$ of the secondary level, all four of these agents are also requesting. This again corresponds to the situation shown in FIG. 2, and these requesting agents will be granted access in the order determined by FIG. 6A of the flow chart. Then the first group of the tertiary level will be serviced.

In the first group $t_{1.1},r_{1.1},d_{1.1},p_{1.1}$ of the tertiary level, only the agents $t_{1.1}$ and $d_{1.1}$ are requesting. This corresponds substantially to the situation shown in FIG. 4, and these requesting agents will be granted access in the order determined by FIG. 6G of the flow chart. Then the second group of the tertiary level will be serviced.

In the second group $t_{1.2},r_{1.2},d_{1.2},p_{1.2}$ of the tertiary level, only the agents $t_{1.2}$ and $p_{1.2}$ are requesting. This corresponds substantially to the situation shown in FIG. 4, and these agents will be granted access in the order determined by FIG. 6I of the flow chart. Then the third group of the tertiary level will be serviced.

In the third group $t_{2.1},r_{2.1},d_{2.1},p_{2.1}$ of the tertiary level, only the agents $d_{2.1}$ and $p_{2.1}$ are requesting. This corresponds inversely to the situation shown in FIG. 5, and the agents will be granted access in the order determined by FIG. 6F of the flow chart. Then the fourth group of the tertiary level will be serviced.

In the fourth group $t_{2.2},r_{2.22},d_{2.2},p_{2.2}$ Of the tertiary level, only the agents $t_{2.2}$ and $d_{2.2}$ are requesting. This corresponds substantially to the situation shown in FIG. 4, and the agents will be granted access in the order determined by FIG. 6G of the flow chart. Then the servicing process will be repeated by returning to the single group of the primary level.

What is claimed is:

1. A method of servicing a plurality of agents requesting access to a bus, said method comprising:

a. providing a communication path for accepting requests from first and second pairs of requesting agents;

b. providing an indication of which of the requesting agents in the first pair was last considered for access to the bus;

c. providing an indication of which of the requesting agents in the second pair was last considered for access to the bus;

d. providing an indication of which of the pairs of requesting agents was last considered for access to the bus;

e. granting access to the requesting agents currently requesting access in accordance with the priority:

i. in the pair not last considered for access, the requesting agent not last considered for access;

ii. in the pair not last considered for access, the requesting agent last considered for access;
iii. in the pair last considered for access, the requesting agent not last considered for access;
iv. in the pair last considered for access, the requesting agent last considered for access.

2. A method as in claim 1 where a missing one of the requesting agents is treated as an agent not requesting access.

3. A method as in claim 1 where communication paths are provided for a plurality of groups of requesting agents, each of said groups comprising first and second pairs of said requesting agents.

4. A method as in claim 3 where the groups are serviced in a redetermined hierarchical order.

5. A system for servicing a plurality of agents requesting access to a bus, said system comprising:
   a. communication path for accepting requests from first and second pairs of requesting agents;
   b. means for providing an indication of which of the requesting agents in the first pair was last considered for access to the bus;
   c. means for providing an indication of which of the requesting agents in the second pair was last considered for access to the bus;
   d. means for providing an indication of which of the pairs of requesting agents was last considered for access to the bus;
   e. means for granting access to the requesting agents currently requesting access in accordance with the priority:
      i. in the pair not last considered for access, the requesting agent not last considered for access;
      ii. in the pair not last considered for access, the requesting agent last considered for access;
      iii. in the pair last considered for access, the requesting agent not last considered for access;
      iv. in the pair last considered for access, the requesting agent last considered for access.

6. A system as in claim 5 where a missing one of the requesting agents is treated as an agent not requesting access.

7. A system as in claim 5 where communication paths are provided for a plurality of groups of requesting agents, each of said groups comprising first and second pairs of said requesting agents.

8. A system as in claim 7 where the groups are serviced in a predetermined hierarchical order.

* * * * *